United States Patent
Mayer et al.

(10) Patent No.: US 8,122,007 B2
(45) Date of Patent: Feb. 21, 2012

(54) METHOD AND SYSTEM FOR INTERACTIVELY EXPLORING DATA OBJECTS

(75) Inventors: Thomas Mayer, Leimen (DE); Frank Dittmar, Walldorf (DE); Sven Hader, Wiesloch (DE); Olga Kreindlina, Heidelberg (DE)

(73) Assignee: SAP AG, Walldorf (DE)

( * ) Notice: Subject to any disclaimer, the term of this patent is extended or adjusted under 35 U.S.C. 154(b) by 527 days.

(21) Appl. No.: 12/276,294

(22) Filed: Nov. 21, 2008

(65) Prior Publication Data

US 2010/0131537 A1     May 27, 2010

(51) Int. Cl.
     *G06F 7/00*     (2006.01)
     *G06F 17/30*     (2006.01)
(52) U.S. Cl. ........................................... 707/713
(58) Field of Classification Search .............. 707/713, 707/717, 721
See application file for complete search history.

(56) References Cited

U.S. PATENT DOCUMENTS

| 7,739,123 B1 * | 6/2010 | Rappaport | 705/2 |
| 2003/0154143 A1 * | 8/2003 | Chen | 705/28 |
| 2010/0070484 A1 * | 3/2010 | Kraft et al. | 707/706 |

* cited by examiner

*Primary Examiner* — Angela Lie

(57) ABSTRACT

A method and system for interactively exploring data objects is provided. A user action selecting a portion of a first one of the data objects. The selected portion of the first one of the data objects comprising at least one attribute correspondingly mapped to a meaning. At least one query is retrieved, the at least one query comprising at least one input parameter correspondingly mapped to the meaning associated with the at least one attribute of the selected portion. In response to a user selection of the retrieved query, a value of the at least one attribute of the selected portion is passed as input to the retrieved query. A search request is generated based on the retrieved query with the passed value as the input parameter to obtain at least a second data object representing supplementary data related to the first one of the data objects.

18 Claims, 6 Drawing Sheets

US 8,122,007 B2

METHOD AND SYSTEM FOR INTERACTIVELY EXPLORING DATA OBJECTS

TECHNICAL FIELD

Embodiments of the invention generally relate to computer systems, and more particularly to methods and systems for interactively exploring data objects.

BACKGROUND

The user interfaces currently available typically do not allow a user to explore data objects in an intuitive way. The amount of information presented to the user is also limited to immediate context of the data object being presented. If the user wishes to explore the data objects further, he may have to leave his current use context to log on to a different application or a system or another user interface to access other information related to the data object he is currently viewing. For example, conventional user interfaces are limited to displaying customer information such as a customer name, address, contact person, customer identification, and sales orders related to the customer. If the user wishes to explore further details such as details of each of the sales order of the customer or the materials in the sales orders, the user has to typically log into a different application or refer to another user interface to see the details. This is not very convenient because the user may have to switch between various user interfaces to comprehend all the details of a particular data object, and in that process, may lose the context of the information. The user may face this problem often since the contextual information of a data object is typically not presented in a single user interface. In addition, because the data objects are retrieved from a diverse group of sources the user typically needs to switch between a number of applications, data sources and user interfaces. Thus there is a need for a reporting tool that enables easy contextual and interactive analysis of complex data reports that is orchestrated through a single user interface screen.

SUMMARY OF THE INVENTION

Embodiments of the invention are generally directed to a method and system for interactively exploring data objects. A user action selecting a portion of a first one of the data objects. The selected portion of the first one of the data objects comprising at least one attribute correspondingly mapped to a meaning. At least one query is retrieved, the at least one query comprising at least one input parameter correspondingly mapped to the meaning associated with the at least one attribute of the selected portion. In response to a user selection of the retrieved query, a value of the at least one attribute of the selected portion is passed as input to the retrieved query. A search request is generated based on the retrieved query with the passed value as the input parameter to obtain at least a second data object representing supplementary data related to the first one of the data objects. The search request comprising at least a search identifier identifying a search connector and an empty result table. The search request is routed for execution of the retrieved query to the search connector identified by the search identifier. The search request is executed in a data source associated with the search connector, the data source being defined in a connector configuration of the search connector. A search result is retrieved from the data source. The search result is obtained by executing the search request in the data source. The empty result table is filled with the search result.

A search connector configuration is instantiated. A data source provider and at least one data source associated with the data source provider is added to the search connector configuration based on a first user action. Metadata associated with the data source provider and the at least one selected data source is retrieved and added to the search connector configuration. The metadata comprising an interface structure having one or more input attributes and one or more output attributes. At least one meaning correspondingly associated with the input attributes and the output attributes are added to the search connector configuration based on a second user action.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Embodiments of the invention are generally directed to a method and system for interactively exploring data objects. A user action selecting a portion of a first one of the data objects. The selected portion of the first one of the data objects comprising at least one attribute correspondingly mapped to a meaning. At least one query is retrieved, the at least one query comprising at least one input parameter correspondingly mapped to the meaning associated with the at least one attribute of the selected portion. In response to a user selection of the retrieved query, a value of the at least one attribute of the selected portion is passed as input to the retrieved query. A search request is generated based on the retrieved query with the passed value as the input parameter to obtain at least a second data object representing supplementary data related to the first one of the data objects.

Figure 1:
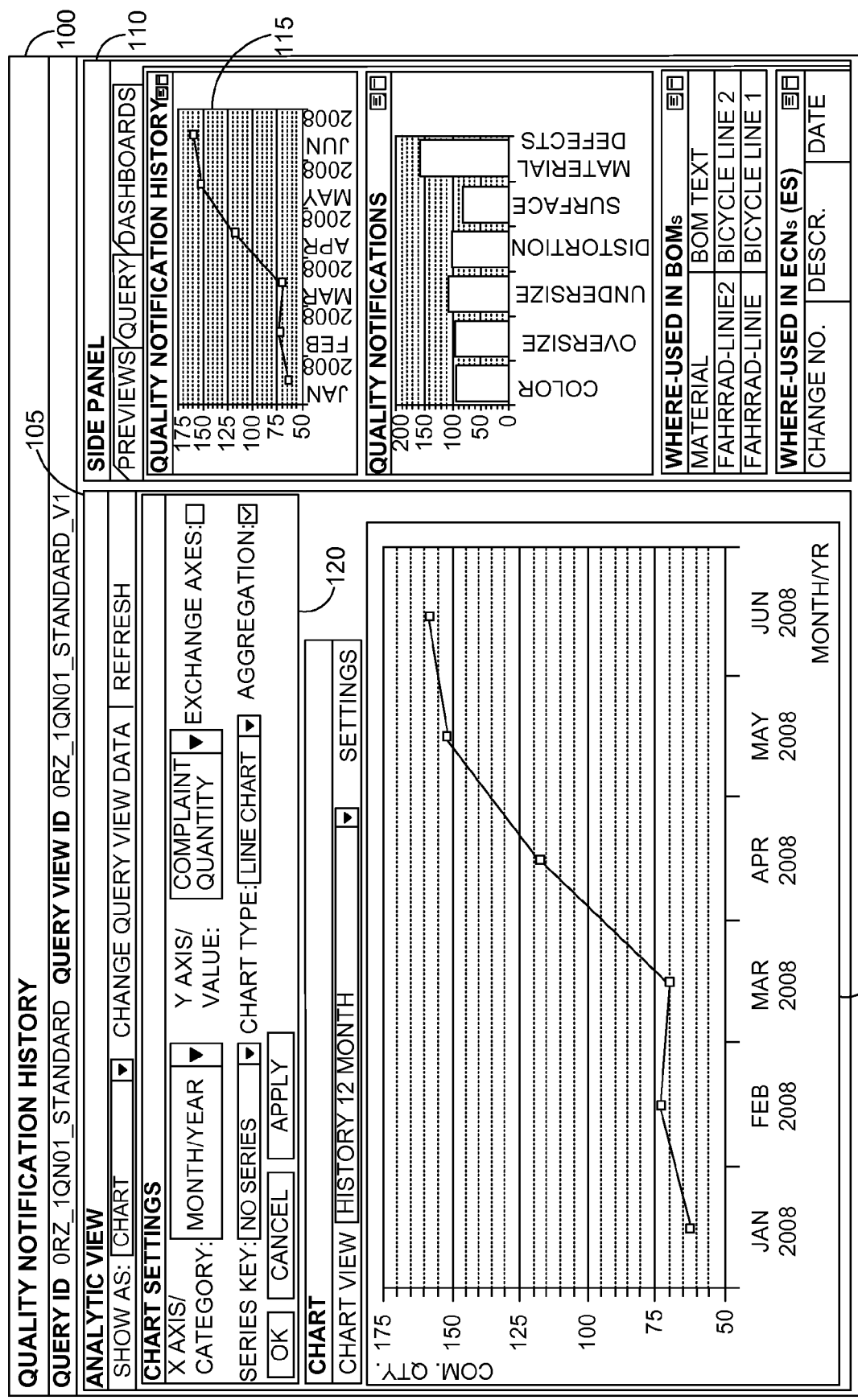
FIG. 1 illustrates a user interface for business data explorer application for facilitating the interactive exploring of data objects according to an embodiment of the invention.

FIG. 1 illustrates a business data explorer operable for facilitating the interactive exploring of data objects according to an embodiment of the invention. In one embodiment, a data object is any data entity that represents information about another entity. The data objects could include but are not limited to, records in a data base, data tables, data fields, analytics, business objects, charts, images, textual description, etc. Examples of a data object in the enterprise context may include customer object, invoice object, material object, collaboration object and the like. A data object typically includes one or more attributes. An attribute is a characteristic of a data object that is part of the metadata about the data object. It is generally a value or a property that describes a data object in greater detail and can influence the way in which the object is processed. Thus, data objects encapsulate not only data but also the business behavior associated with the entity that it represents. For instance a material data object may have attributes such as a material object, a date, a month, a year, a material quantity and the like. Attributes of a data object are assigned corresponding meanings which serve to further describe a business context associated with their use without being limited by labels provided to various fields and data types in a diverse group of business intelligence systems and databases. For instance, a material number attribute may have a label "matl no" in one system but "MaterialNum" in another but both could be labeled to have the meaning "Material" and a customer identifier attribute labeled as "CustID", "CustomerIden" in different systems may have the same meaning "Customer".

A query is used to retrieve one or more data objects based on specific criteria. It can be modeled declaratively. A query has three parts: input object, output object and query object. An input object defines the query criteria. An output object defines the result set of the query execution. A query object maintains the relation between the input object and the output object. The specific criteria is a search criteria including one or more input parameters. Every query is defined by a query definition as part of a query configuration.

The object navigator window 105 allows a user to interactively explore data related to data objects of interest based on contextually discovering and executing one or more queries. The business data explorer 100 allows the user to further explore any of the supplementary data objects displayed in side panel 110. The user may further explore the supplementary data objects in the side panel 110 by bringing it to the object navigator window 105. For example, the supplementary data object of FIG. 1, quality notification history 115, may be brought to the object navigator window 105 by dragging or double clicking the quality notification history 115 chart. A quality notification is used to indicate a defect in a material.

The quality notification history 125 displayed in the object navigator window 105 may be further explored in various ways using data object settings 120. For example, format of quality notification history 125 may be changed from chart to any other format such as table, the chart type may be changed to bar chart, the X-axis and Y-axis values may be changed and the X-axis and Y-axis may be swapped. In an embodiment, the X-axis of the chart which is scaled on Month/Year basis may be scaled down to Week/Month or Day/Week to explore the quality notifications received on a daily or weekly basis. Similarly, the X-axis may also be scaled up to Quarter/Year or Half/Year. In another embodiment, the Y-axis value may be changed from Complaint quantity to say, for example, average time taken to solve the complaint. Further, the period for which the quality notifications are shown may also be changed.

In an embodiment it is possible to decouple the query processing in the side panel 110 from the data object processing in the object navigator window 105. The query processing is executed asynchronously in a separate task. This allows a user, for example, to switch to a different tab in the side panel 110. In an asynchronous query processing each query is processed in a new task.

Figure 2:
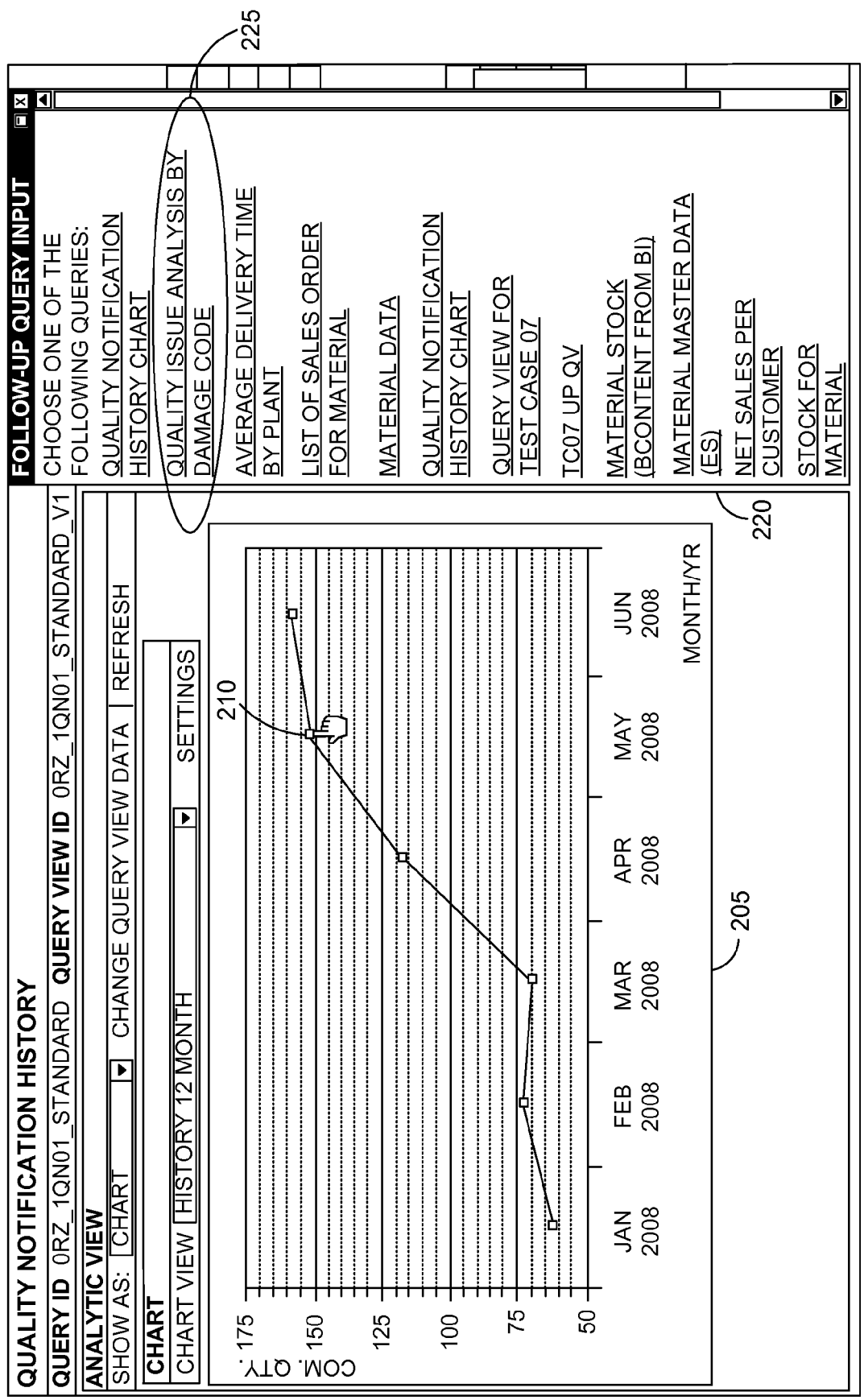
FIG. 2 illustrates the exploring of a data point in the business data explorer according to an embodiment of the invention.

FIG. 2 illustrates the exploring of a data point in the business data explorer according to an embodiment of the invention.

The object navigator window 105 allows the user to drill down in a business context to further view a data of interest. As the user selects a data point 210 from the graph 205 relating to a data object in the object navigator window 105, a query repository is searched for one or more queries with input parameters having their meanings matching with the meanings of one or more attributes of the data object. Preferably, the query repository stores all possible queries for the data object. In response to the user selection of the data point 210, a list of queries 220 is retrieved and presented to the user in the object navigator window 105. In an embodiment, the list of queries 220 includes queries that have at least one meaning of an input parameter matching with a meaning of an attribute of the data object. In an embodiment, the retrieved list of queries 220 is typically displayed by the object navigator window 105 as query previews 225 with each query preview 225 including a short description of a retrieved query and a link to access the query. The user may select one or more of the queries for execution based on the data of interest. A selected query from the retrieved list of queries 220 retrieves data supplementary to the data object 205 currently being displayed in the object navigator window 105.

Figure 3:
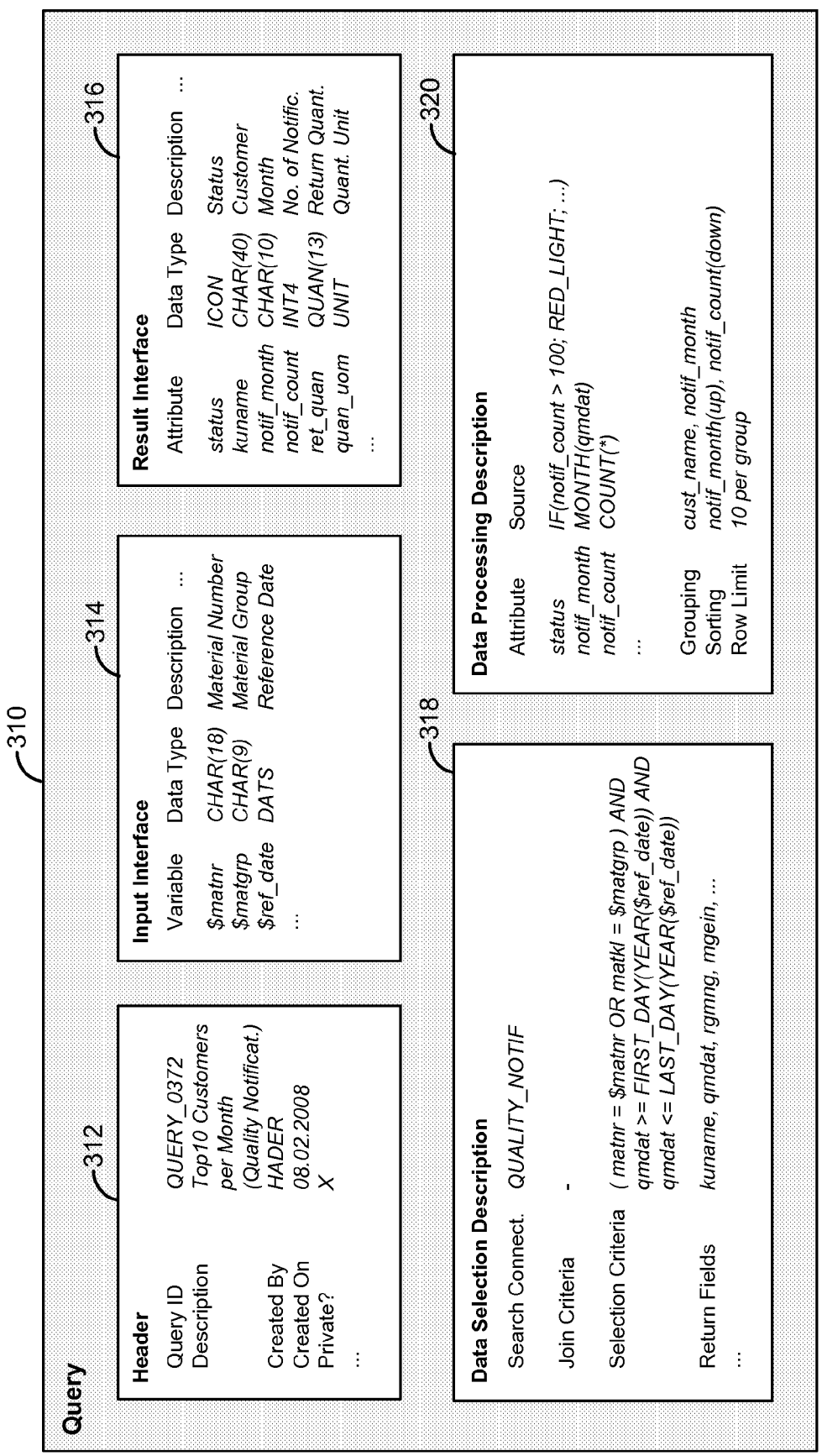
FIG. 3 illustrates a query data structure according to an embodiment of the invention.

FIG. 3 illustrates a query data structure according to an embodiment of the invention. Query data structure 310 includes five main building blocks. A header 312 containing information to identify a query (e.g., ID, description) as well as administrative information (e.g., Private query? Created/changed when? By whom?). An input interface 314 specifying the input parameters (e.g., variables) accepted by the query. A result interface 316 specifying attributes of the result parameters returned by the query. A data selection description 318 specifying which data records are to be retrieved using which search connector are based on selection criteria (e.g., depending on the values of the query input parameters). A data processing description 320 specifying how the result attributes are filled from the retrieved data records (e.g., including grouping, aggregation, sorting).

A query generally retrieves data relating to a data object by searching a data source based on receiving one or more attribute values of the data object as input parameters. Input parameters and output or result parameters of a query preferably have a meaning assigned thereto, which collectively define the meanings associated with the query. For instance, a query may take a material number input parameter having a meaning "Material" as its input and based on some selection criteria return a customer identifier variable having an assigned meaning of "Customer" as a result. Thus, such a query may be presented to be of interest to any user working in a business context having to do with material, customer and some combination thereof.

Figure 4:
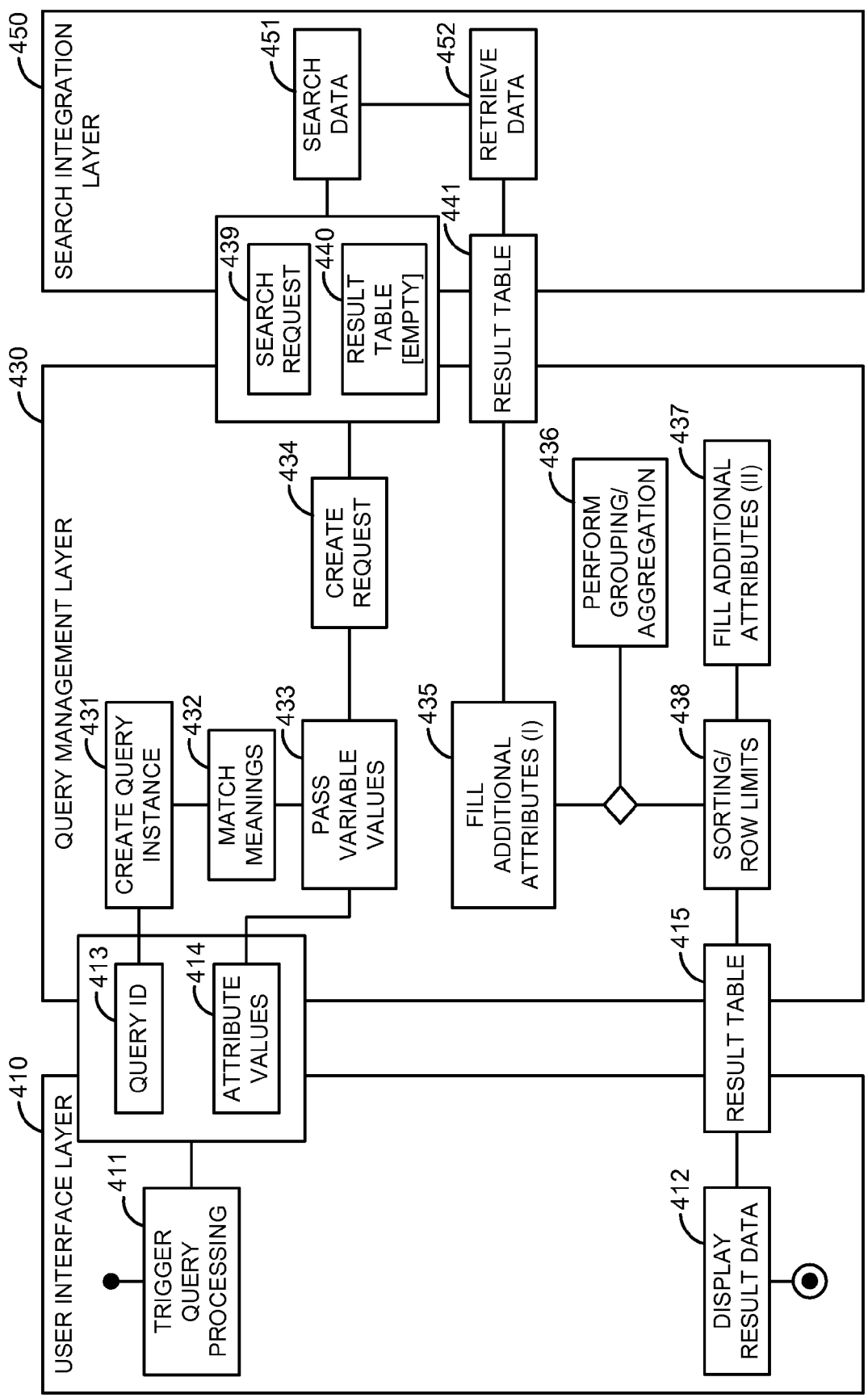
FIG. 4 is a block diagram illustrating interactively exploring data objects by way of query management and search integration according to an embodiment of the invention.

FIG. 4 illustrates interactively exploring data objects by the way of query management and search integration according to an embodiment of the invention. The user interface layer 410 is associated with an object navigator application to enable a user to explore data objects. The processing of a query is triggered at 411 by an action of the user in the user interface layer 410, for instance. In one embodiment, the user triggers the processing of a query at 411 by selecting a query of interest from the retrieved list of queries (e.g., 220). The user may select a query of interest in the object navigator window by clicking on a query preview of the query.

Upon triggering the processing at 411, the user interface layer 410 passes on a query identifier (ID) 413 of the query selected along with the possible attribute values 414 that the query may take during the execution of the query to the query management layer 430. The attribute values 414 are the values of one or more attributes of the data object currently being displayed in the object navigator window. The attribute values 414 may also be values of one or more attributes specific to a selected data point. The query ID 413 uniquely identifies the selected query. In an embodiment, query IDs 413 are defined as part of a query configuration by an administrator. In addition to the query ID 413, the query configuration may include a description, one or more input parameter IDs, data types, search IDs, meanings and the like. Using the query ID 413, an instance of the selected query is created 431 that reads the respective query configuration. For the remainder of the process, this query instance is the object that combines information related to the current query processing (e.g., a query definition, a result data, a processing status) on the query management layer.

Once the instance of the selected query is created 431, the meanings of the data object attributes selected to be passed as input parameters are matched 432 with the meanings of the input parameters of the selected query. In step 433, the attribute values 414 of only those data objects whose meanings match with the meanings of the corresponding query input parameters are passed for further processing. A search request is created at 434 that contains the name of the search connector defined by the search ID in the query configuration, the selection criteria (the input parameter values for defining filters) and a maximum number of data records to be returned ("row limit"). Furthermore, an empty result table is created that contains one field for each result attribute requested by the query. A search connector establishes the connection between a data source and the search integration layer 450 providing access to specific data sources at a specific destination or list of destinations. The definition of an exemplary search connector includes the description of the selection attributes, data source details and the structure of the result data. The definition of the search connectors is defined as part of a connector configuration. Every search connector is assigned a unique search ID. The search IDs describe which data sources are to be selected via which search connector. Data sources may require specific search input syntax and may return results in a specific format. While these provider-specific characteristics are handled in the search integration layer 450, a query representation (as well as a result data representation) used in the query management layer 430 is generic. That is, queries are stored in a provider-independent format. In this way, a system may be easily enhanced by additional data sources without the need to change the query management layer 430. The search connectors hide the details of the associated data source interface. Search connectors convert the requests from the query management layer 430 to the language of the data source and return the results received from the data source in a unified flexible structure. According to an embodiment, depending on the associated data source a search connector is either a configurable or a fixed implementation.

In an embodiment, the connector configuration starts with retrieving metadata information from a data source provider that provides data sources. The metadata includes attributes to call later on the data source (e.g., name of the search object connector ID and request ID) and a description of the interface structure. During the configuration, the user may have to add properties of the attributes, which may not be provided by the data source itself (e.g. data type, meaning). In one embodiment, this metadata is stored as part of the connector configuration in the search integration layer 450. The metadata can be used in the search integration layer 450 at run time to fulfill the request of the query management layer 430 with a response. It could also be used in the configuration of the query management layer 430. In a second step, the search integration layer 450 provides the metadata information of the search connector to the query management layer 430. The metadata information contains search IDs of search connectors, descriptions of the interface structures, data type of columns, meanings, and related fields. The metadata information is used by the query management layer 430 to request a search from the search integration layer 450.

The configuration of the search connectors includes, but is not limited to, specifying systems for search, specifying data sources, defining interface descriptions, defining input attributes and defining output attributes. In an embodiment, during the configuration of the search connectors, a user first specifies a data source provider and a data source. The system then retrieves the metadata describing the data source from the data source provider. This metadata includes a description of the interface structures (e.g., input and output attributes). The user then specifies the meanings for each of the attributes of the interface structure. For each attributes of the interface structure the user may specify at least one meaning. The user specifies the meaning based on his or her domain knowledge about the selected data source. The user may also select the meanings from a predefined list provided by a third party, for instance. This list can be enhanced by the user, depending on his needs and understanding of the fields. The selected meanings may also depend on the business context.

As indicated above, the query management layer 430 uses the metadata information received from search integration layer 450. During the configuration of a query, the user selects a search connector from the received metadata that may be used to search and retrieve data. According to one embodiment, the input and output attributes of the selected search connector including their properties (e.g. the meaning) are adopted for the query. So the meanings predefined for the search connector as part of the connector configuration are initially copied to the query as default values. The user however may overwrite the meanings, for example, to adapt them to a business case, where the query is used. For instance, an attribute with the meaning 'Product' in the connector configuration may be changed to 'Material' or 'Service' during query configuration.

During query processing, the search request 439 and the empty result table 440 are passed on to the search integration layer 450. Based on the one or more search IDs included in the search request, the search integration layer 450 routes the search request to the search connectors identified by the search IDs. The search integration layer 450 then conducts searches 451 for the requested objects in the data sources associated with the search connectors. Data is retrieved 452 as a result of the search from the data sources and the result table 440 is filled accordingly. For the objects found in the data source a corresponding data record is inserted into the result table 440.

Some data of interest may have to be consolidated from a number of different data sources. In this event, it may be necessary to send queries that use two search connectors to retrieve data and join the results. A join is a relation between two search connectors that allows combining data from both connectors in the same result table. For example, a join between search connectors 'Sales Order' and 'Customer' (via the customer number) would allow to "enrich" sales order information by the detailed address information of the respective customer. Therefore, two search requests are passed to the search integration layer 450 per processed query. After the results of both requests are available, they are merged according to the join criteria. This merge is done in the result table 440 of the main request (that already contains fields for the attributes of the dependent request). In situations where there is no data record in the dependent result data matching, the join criteria of a data record in the main result data can be handled in two ways; an inner join where the data record is removed from the result data or a left outer join where the data record is kept in the result data, but the attributes of the dependent search connector are initial.

The result table 441 is passed back to the query management layer 430. The information provided by the search connector may not be sufficient for displaying the results requested in the user interface layer 410. For example, the search connector may provide several quantity attributes to be added up into an additional "total quantity" attribute. Or, one or more attributes implicitly form a "status" of the object that is to be presented in an explicit "status icon" attribute. For such cases, additional attributes can be defined in the query and filled 435 using formulas. In these formulas, all attributes of the current data record can be used as input.

In step 436 grouping and aggregation is performed. Often, the user is interested in general aggregated information while the available search connector provides information at a more detailed level. Furthermore, the user might not be interested in aggregated information for all search results but may be interested only in some groups. Grouping is the process of concentrating all data records of the result table 441 that belong to the same group into one data record (that replaces the original records). Groups are defined via one or more result attributes, that is, all data records with the same values of these attributes belong to the same group. Potential grouping attributes are those used to classify objects of the underlying data source, like material, customer, vendor, delivery date. Aggregation is the process of calculating values for non-grouping attributes during grouping. The type of calculation is specified by the aggregation operator (SUM, MIN, COUNT, etc.) assigned to the attribute. Aggregation can handle numerical and date-time attributes; textual attributes are preferably not considered. For all non-grouping attributes with no aggregation operator assigned, the value in the "grouped" data record will be an arbitrary one from the value set of this attribute in this group.

The filling additional attributes in step 437 is an activity that is similar to the activity at step 435 as described above. It is necessary since filling some additional result attributes might require other attributes whose values are not available before grouping/aggregation.

Sorting of result data and defining of row limits is done in step 438. It might be desirable to pass the search results to the UI in a certain "default" sort order. This sort order can be defined in the query by specifying a sequence of attributes and, for each attribute, the sort direction (ascending, descending). The data records in the result table are sorted accordingly. Finally, the number of data records in the result table might be reduced if a row limit is defined (like "return no more than 10 records").

Result table 415 is handed over to the user interface layer 410 for displaying the result data 412 in the object navigator window.

Figure 5:
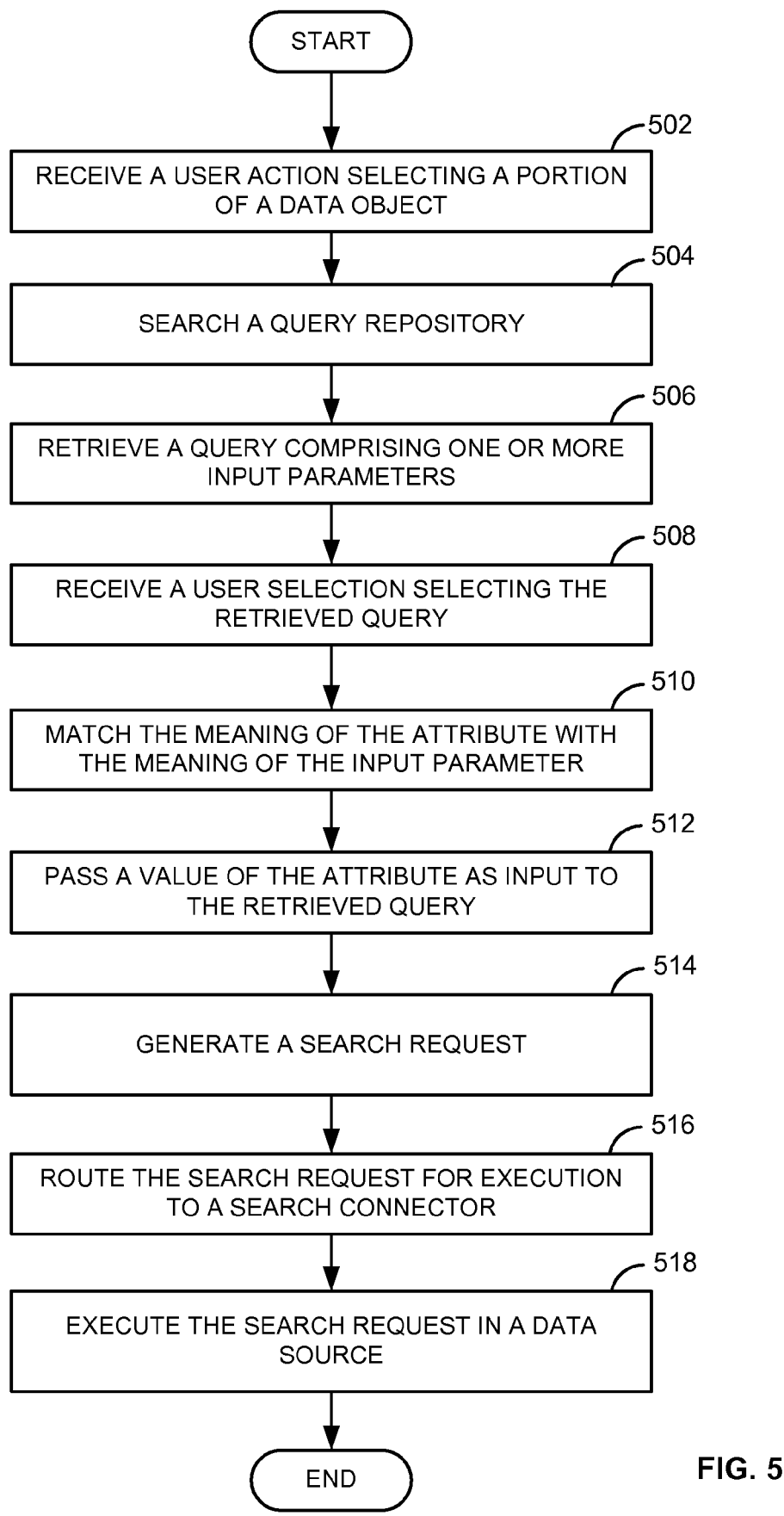
FIG. 5 is a flow diagram of a process for interactively exploring data objects according to an embodiment of the invention.

FIG. 5 is a flow diagram of a process for interactively exploring data objects according to an embodiment of the invention. In process block 502 a user action is received selecting a portion of a data object. The portion of the data object is typically selected from an object navigator window. The object navigator window is part of an object navigator application included in a user interface layer. The selected portion of the data object includes one or more attributes with each of the attributes correspondingly mapped to meanings. In process block 504, a query repository is searched based on the meanings of the attributes. In process block 506, one or more queries are retrieved, each of the retrieved queries having input parameters with meanings mapped to each of the input parameters. In an embodiment, only those queries are retrieved for which the meanings of the input parameters match with the meanings of at least one attribute of the data object.

In process block 508 a user selection is received for selecting a retrieved query. The processing of the retrieved query is triggered by this selection of the user in the user interface layer. The user may select a query of interest in the object navigator window by clicking on a query preview of the query.

In process block 510, the meanings of the data object attributes are matched with the meanings of the input parameters of the selected query. In process block 512, the attribute values of each data object attribute are passed to the corresponding query input parameters whose meanings match with the attribute meanings. In process block 514, a search request is created that contains the name of the search connector defined by the search ID in the query configuration, the selection criteria (the input parameter values) and a maximum number of data records to be returned ("row limit"). The search request and the empty result table are passed on to the search integration layer. In process block 516, based on one or more search IDs included in the search request, the search integration layer routes the search request to the search connectors identified by the search IDs. In process block 518, the search integration layer conducts searches for the requested objects in the data sources associated with the search connectors.

Figure 6:
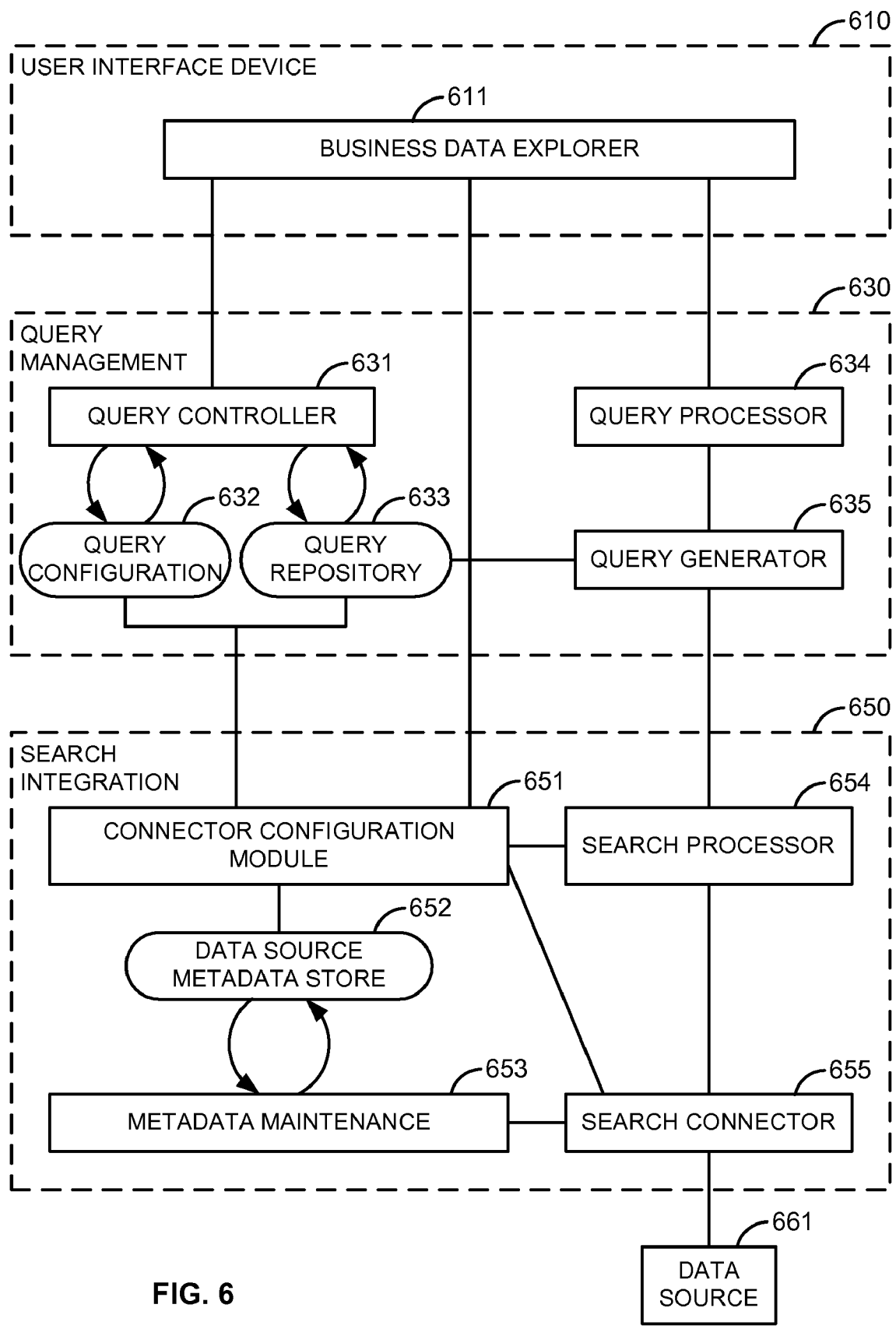
FIG. 6 is a block diagram of a system for interactively exploring data objects useful for implementing the invention according to an embodiment of the invention.

FIG. 6 is a block diagram of a system for interactively exploring data objects useful for implementing the invention according to an embodiment of the invention. User interface device module 610 includes a business data explorer 611 that allows a user to explore data objects. The query management module 630 includes a query controller 631, a query processor 634, a query generator 635, a query configuration 632 and a query repository 633. The search integration module 650 includes a connector configuration module 651, a search processor 654, a data source metadata store 652, a metadata maintenance module 653 and a search connector 655.

A user action is received for selecting a portion of a data object from the business data explorer 611. The portion of the data object is typically selected from an object navigator window. In one embodiment, the object navigator window is part of a business data explorer 611 included in the user interface device 610. The selected portion of the data object includes one or more attributes with each of the attributes correspondingly mapped to meanings. The query controller 631 searches the query repository 633 based on the meanings of the attributes. The query repository 633 stores variants of queries for a data object. The query controller 631 then retrieves one or more queries having input parameters with meanings mapped to each of the input parameters. The retrieved queries are displayed to the user in the business data explorer 611. In an embodiment, only those queries for which the meanings of the input parameters match with the meanings of at least one attribute of the data object are retrieved.

The processing of a query is triggered by a user action in the business data explorer 611. The user triggers the processing of a query by selecting a query of interest from the retrieved list of queries. The user may select a query of interest in the object navigator window by clicking on a query preview of the query.

The user interface device 610 passes on a query identifier (ID) of the selected query along with the possible attribute values that the query may take during the execution of the query to the query management module 630. The attribute values are the values of one or more attributes of the data object currently being displayed in the object navigator window. The attribute values may also be values of one or more attributes specific to the selected data point. The query ID uniquely identifies the selected query. In an embodiment, query IDs are defined as part of the query configuration 632 by an administrator. In addition to the query ID, the query configuration 632 may include a description, one or more input parameter IDs, data types, search ID, meanings and the like.

Based on the query ID, an instance of the selected query is generated by the query processor 634. Once the instance of the selected query is created, the query processor 634 matches the meanings of the data object attributes with the meanings of the query input parameters of the selected query. The query processor 634 passes the attribute values of every data object attribute to the corresponding query input parameters whose meanings match with the attribute meanings. A search request is created by the query generator 635 that contains the name of the search connector defined by the search ID in the query configuration 632, the selection criteria (e.g., input parameter values) and a maximum number of data records to be returned (i.e., row limit"). Furthermore, an empty result table is created by the query generator 635 that contains one field for each result attribute requested by the query.

The connector configuration module 651 enables a user to create definitions of one or more search connectors 655 and stores the definitions of the search connectors 655. The definition of the search connector 655 includes the description of the selection attributes, data source details and the structure of the result data. The definition of the search connectors 655 is defined as part of a connector configuration. Every search connector 655 is assigned a unique search ID. The search IDs describe which data sources 661 are to be selected via which search connector 655. The data source metadata store 652 stores details of the data sources 661 associated with each of the search connectors 655. The metadata maintenance 653 allows an administrator to create search connector configuration and data source metadata store 652.

The search request generated by the query generator 635 and the empty result table are passed on to the search integration module 650. Based on the one or more search IDs included in the search request, the search processor 654 routes the search request to the search connector 655 identified by the search ID. The search connector 655 then conducts searches for the requested objects in the data source 661 associated with the search connector 655. Data is retrieved as a result of the search from the data source 661 and the result table is accordingly filled and sent back to the search connector 655. The search connector 655 then sends the result table to the query management module 630 that prepares the result data for display to the user. The results are finally displayed to the user in the user interface module 610.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for tangibly storing electronic instructions. For example, the invention may be implemented as a method performed in a client-server network with the execution the methods distributed across the network.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. For instance, the detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims which follow.

What is claimed is:

1. A computer-implemented method for interactively exploring data objects associated with a business context, the method comprising:

receiving a user action selecting a portion of a first one of the data objects, the selected portion of the first one of the data objects comprising at least one attribute correspondingly mapped to a meaning;

retrieving at least one query comprising at least one input parameter correspondingly mapped to the meaning associated with the at least one attribute of the selected portion;

in response to a user selection of the retrieved query, passing a value of the at least one attribute of the selected portion as input to the retrieved query;

generating a search request based on the retrieved query with the passed value as the input parameter to obtain at least a second data object representing supplementary data related to the first one of the data objects; and routing the search request for execution of the query to a search connector defined as part of a query configuration of the retrieved query.

2. The method of claim 1, wherein passing a value of the at least one attribute of the selected portion as input to the retrieved query further comprises matching the meaning of the at least one attribute with the meaning of the input parameter of the query.

3. The method of claim 1, wherein retrieving the at least one query further comprises:
searching a query repository based on the meaning; and
retrieving the query from the query repository.

4. The method of claim 1 further comprising:
accessing a connector configuration comprising a unique search identifier for a search connector, the search connector being associated with a data source;
accessing a query configuration of the retrieved query comprising a unique query identifier for the query; and
mapping the search identifier of the search connector to the query identifier of the query.

5. The method of claim 4, wherein the mapping of the search identifier of the search connector to the query identifier of the query comprises adding the search identifier as configuration data in the query configuration.

6. The method of claim 1, further comprising:
executing the search request in a data source associated with the search connector.

7. The method of claim 1, wherein the first one of the data objects is a result of a previously executed query.

8. A system for interactively exploring data objects associated with a business context, the method comprising:
a user interface device operable for receiving a user action selecting a portion of a first one of the data objects, the selected portion of the first one of the data objects comprising at least one attribute correspondingly mapped to a meaning;
a query controller operable for retrieving at least one query comprising at least one input parameter correspondingly mapped to the meaning associated with the at least one attribute of the selected portion;
a query processor operable for matching the meaning of the at least one attribute with the meaning of the input parameter and passing a value of the at least one attribute of the selected portion as input to the retrieved query in response to a second user selection of the retrieved query;
a query generator operable for generating a search request based on the retrieved query with the passed value as the input parameter to obtain at least a second data object representing supplementary data related to the first one of the data objects; and
a search processor for routing the search request for execution of the query to a search connector, the search connector being defined as part of a query configuration of the query.

9. The system of claim 8 further comprising a query configuration module for defining a query configuration comprising a unique query identifier for the query.

10. The system of claim 8 further comprising a connector configuration module for defining a connector configuration comprising a unique search identifier for a search connector, the search connector being associated to a data source.

11. The system of claim 8 further comprising a search connector for converting the search request from an initial format to a format specific to an associated data source and executing the search request in the data source associated to the search connector,
the search connector receiving and converting the results of executing the search request back to the initial format.

12. A machine-accessible medium that provides instructions that, when executed by a machine, cause the machine to perform operations comprising:
receiving a user action selecting a portion of a first one of the data objects, the selected portion of the first one of the data objects comprising at least one attribute correspondingly mapped to a meaning;
retrieving at least one query comprising at least one input parameter correspondingly mapped to the meaning associated with the at least one attribute of the selected portion;
in response to a user selection of the retrieved query, passing a value of the at least one attribute of the selected portion as input to the retrieved query;
generating a search request based on the retrieved query with the passed value as the input parameter to obtain at least a second data object representing supplementary data related to the first one of the data objects; and
routing the search request for execution of the query to a search connector defined as part of a query configuration of the retrieved query.

13. The machine-accessible medium of claim 12, wherein passing a value of the at least one attribute of the selected portion as input to the retrieved query further comprises matching the meaning of the at least one attribute with the meaning of the input parameter of the query.

14. The machine-accessible medium of claim 12, wherein the first one of the data object is a result of executing a second query.

15. The machine-accessible medium of claim 12, wherein retrieving the at least first query further comprises:
searching a query repository based on the meaning; and
retrieving the query from the query repository.

16. The machine-accessible medium of claim 12 further providing instructions which when executed by the machine cause the machine to perform further operations comprising:
accessing a connector configuration comprising a unique search identifier for a search connector, the search connector being associated with a data source;
accessing a query configuration of the retrieved query comprising a unique query identifier for the query; and
mapping the search identifier of the search connector to the query identifier of the query.

17. The machine-accessible medium of claim 16, wherein the mapping of the search identifier of the search connector to the query identifier of the query comprises adding the search identifier as configuration data in the query configuration.

18. The machine-accessible medium of claim 12 further providing instructions which when executed by the machine cause the machine to perform further operations comprising:
executing the search request in a data source associated with the search connector.

* * * * *